April 19, 1932. H. M. ALLISON ET AL 1,854,244
MACHINE FOR MEASURING TWO-FLUTED TAPS
Original Filed Oct. 22, 1928 3 Sheets-Sheet 1
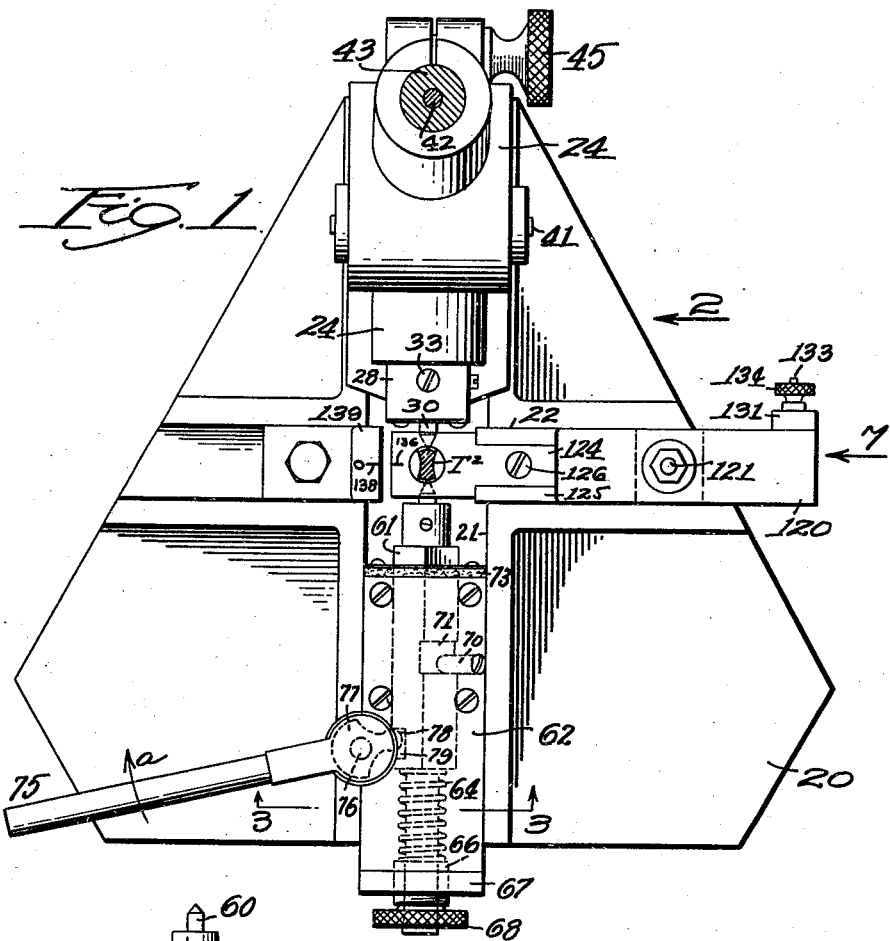
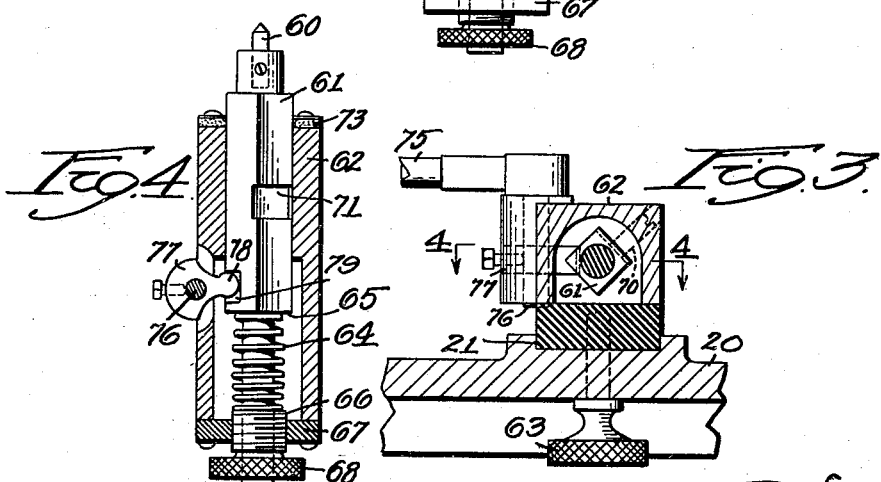

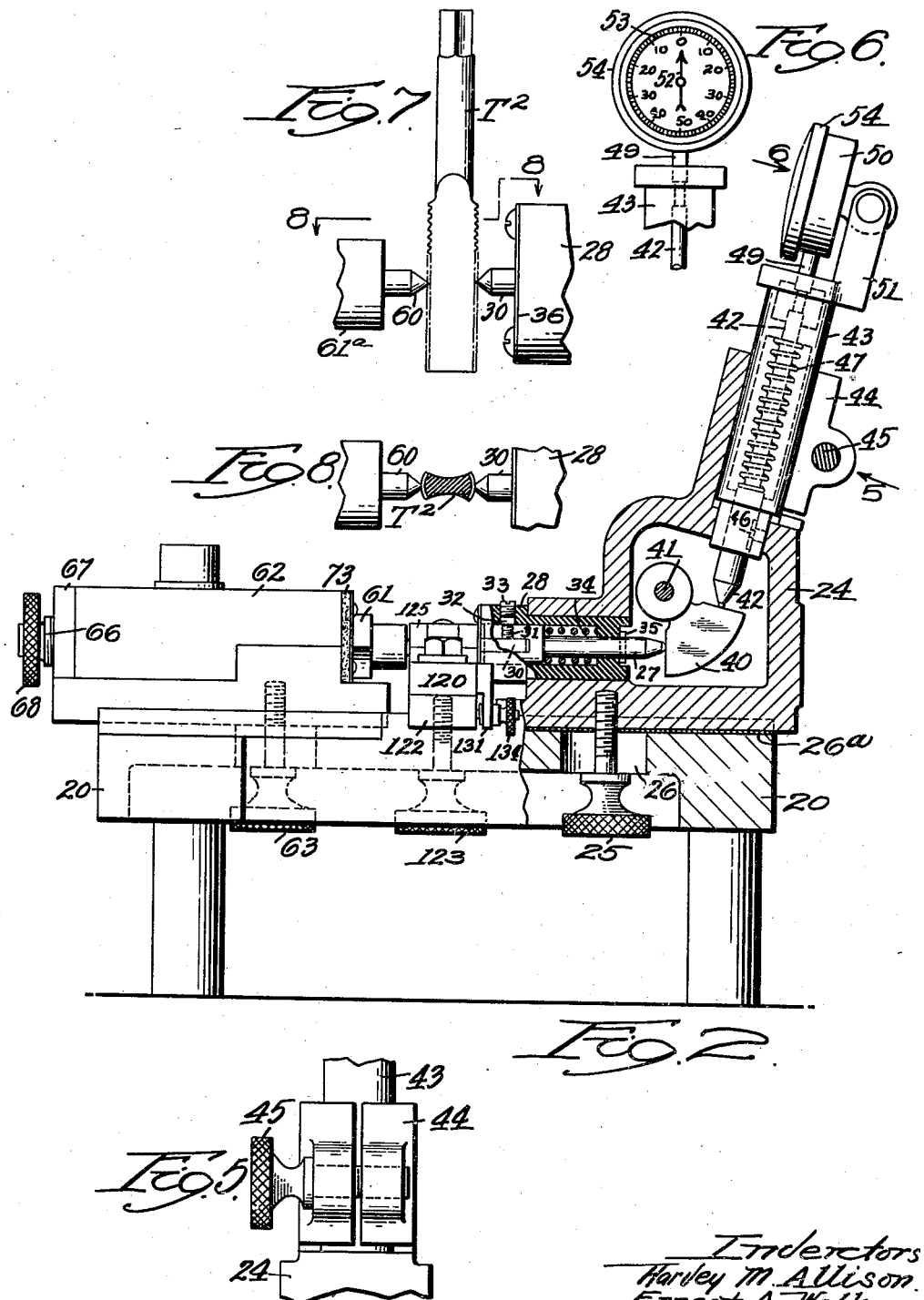

April 19, 1932.    H. M. ALLISON ET AL    1,854,244
MACHINE FOR MEASURING TWO-FLUTED TAPS
Original Filed Oct. 22, 1928    3 Sheets-Sheet 3
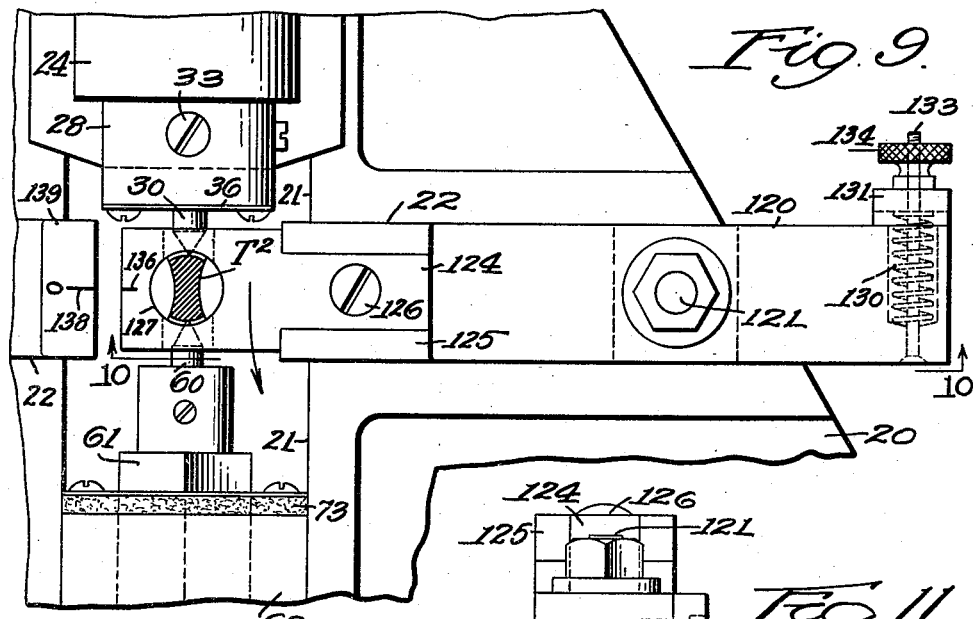
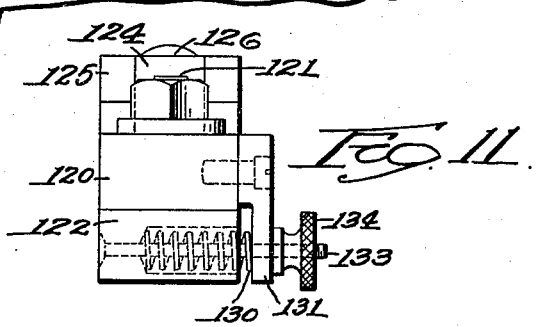
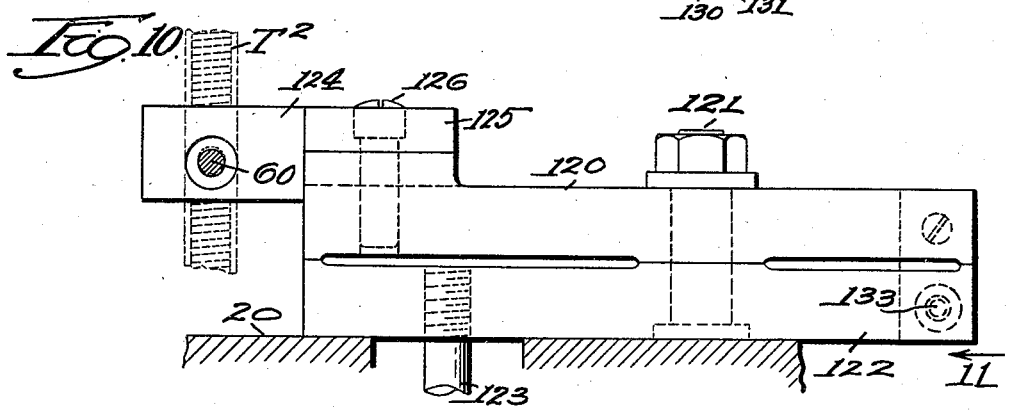
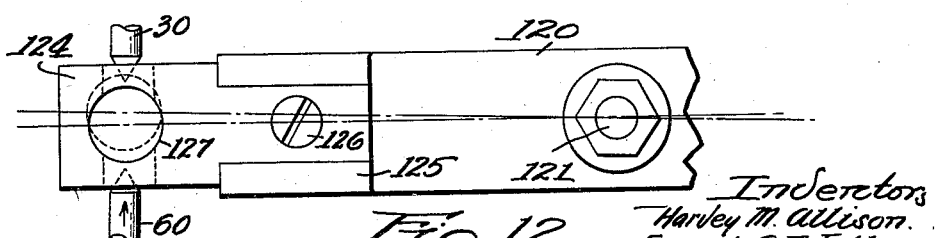
Inventors
Harvey M. Allison.
Ernest A. Walker
by attorneys Patented Apr. 19, 1932

1,854,244

UNITED STATES PATENT OFFICE

HARVEY M. ALLISON AND ERNEST A. WALKER, OF WORCESTER, MASSACHUSETTS, ASSIGNORS TO JOHN BATH, OF WORCESTER, MASSACHUSETTS

MACHINE FOR MEASURING TWO-FLUTED TAPS

Original application filed October 22, 1928, Serial No. 314,032. Divided and this application filed April 2, 1930. Serial No. 441,153.

This is a division of our prior application Serial No. 314,032, filed by us October 22, 1928.

This invention relates to a machine for measuring taps or other threaded work and particularly to a machine for indicating variations in size of such work with respect to a standard or master gauge.

It is the general object of our invention to provide a machine by which such measurements and comparisons may be quickly and easily made and by which the comparative variations from a standard gauge will be plainly shown.

A further object is to provide a measuring machine which may be readily adapted to the measurement of taps of different sizes and pitches.

Our invention further relates to arrangements and combinations of parts which will be hereinafter described and more particularly pointed out in the appended claims.

An operative form of the invention is shown in the drawings in which

Fig. 1 is a plan view of our improved machine, adapted to the measurement of two-fluted taps;

Fig. 2 is a side elevation thereof, partly in section, and looking in the direction of the arrow 2 in Fig. 1;

Fig. 3 is a partial sectional front elevation, taken along the line 3—3 in Fig. 1;

Fig. 4 is a sectional plan view, taken along the line 4—4 in Fig. 3;

Fig. 5 is a detail rear view, looking in the direction of the arrow 5 in Fig. 2;

Fig. 6 is a detail front view, looking in the direction of the arrow 6 in Fig. 2;

Fig. 7 is a detail side elevation, looking in the direction of the arrow 7 in Fig. 1;

Fig. 8 is a sectional plan view, taken along the line 8—8 in Fig. 7;

Fig. 9 is an enlarged plan view of certain parts;

Fig. 10 is a sectional side elevation, taken substantially along the line 10—10 in Fig. 9;

Fig. 11 is a detail side elevation, looking in the direction of the arrow 11 in Fig. 10, and Fig. 12 is a partial plan view, showing certain parts in a different position.

Referring to the drawings, our improved measuring machine comprises a stand or table 20 (Fig. 1) having guideways 21 and 22 formed on the upper surface thereof, in the shape of a rectilinear cross.

A stand or casing 24 is slidable in the rear portion of the guideway 21 and may be secured in adjusted position therein by a clamping screw 25 (Fig. 2) extending through a slot 26 in the table 20. A thin plate or shim 26¹ is interposed between the under surface of the casing 24 and the bottom of the guideway 21, for a purpose to be described.

A plunger 27 is slidable in a bushing 28 fixed in the casing 24 and is provided with a contact member 30 which may be secured therein by a set screw 31 (Fig. 2). Access to the screw 31 may be had through an opening 32 in the bushing 28, said opening being normally closed by a screw 33. A spring 34 presses the plunger 27 yieldingly outward and a pin 35 limits the outward movement. The front end of the bushing 28 may be provided with a cover plate 36 through which the contact member 30 is slidable. The cover plate assists in preventing the access of dirt to the indicating mechanism.

A segment member 40 is pivoted at 41 in the casing 24 and forms an angle connection between the rear end of the plunger 27 and the lower end of a spring-pressed plunger 42, slidable vertically in a bearing member 43 mounted in a split holder 44 on the casing 24. The member 43 may be secured in desired adjusted position by tightening the split holder 44 by means of a clamping screw 45 (Fig. 5).

The plunger 42 is keyed in the bearing frame 43, as indicated at 46, and is provided with a spring 47 yieldingly pressing the plunger downward. At its upper end, the plunger 42 engages the plunger 49 of a magnifying and indicating device 50, preferably mounted on an upper projection 51 (Fig. 2) of the bearing frame 43.

The indicating device 50 is provided with a pointer 52 movable by the plungers 42 and 49 over a dial 53. The dial 53 is preferably mounted in a ring 54 frictionally held on the casing of the indicator 50, so that it may be turned angularly as desired in either direction.

The indicating device 50 may be otherwise of any usual commercial form and the remaining details thereof form no part of our present invention.

A contact member or anvil 60 is mounted in a square plunger 61 (Figs. 1 and 2), which is slidably mounted in a stand 62. The stand 62 is adjustable forward and rearward in the front portion of the guideway 21 and may be secured in adjusted position in said guideway by a clamping screw 63.

A spring 64 (Fig. 4) is interposed between a shoulder 65 on the plunger 61 and a bushing 66 threaded in a cap 67 at the front end of the stand or casing 62. The bushing 66 has a knurled head 68 for convenient adjustment of the tension on the spring 64. It will be understood that the spring 64 is very substantially stronger than the combined strength of the springs 34 and 47 on the plunger 27 previously described.

A stop pin 70 (Fig. 1) in the stand 62 projects into a slot 71 in the square plunger 61 and engages an end wall of the slot, thereby limiting rearward movement of the anvil or contact member 60 and providing a definite zero position thereof. A felt packing 73 prevents the entrance of dirt around the plunger 61.

A hand lever 75 is provided with a stud 76 (Fig. 3) pivoted in a fixed bearing in the stand 62 and having a member 77 secured thereto. The member 77 has a convex head 78 positioned in a slot 79 in the plunger 61. By turning the handle 75 in the direction of the arrow $a$ in Fig. 1, the plunger 61 may be forced forward or away from the work, compressing the spring 64. The head 78 has a limited lost motion in the slot 79.

The form of our invention shown herein is particularly adapted to the measurement of taps having only two lands or sets of teeth. For positioning such taps we provide a lever 120 (Fig. 9) pivoted on a stud 121 fixed in a stand 122 adjustable in the transverse guideway 22 and secured in adjusted position by a clamping screw 123 (Fig. 2).

A positioning member 124 is mounted in guideways 125 (Fig. 9) on the lever 120 and may be secured in position thereon by a clamping screw 126. An opening 127 is formed in the member 124 in such a position that its axis intersects the axis of the members 30 and 60 previously described. The opening 127 is very slightly larger than the outside diameter of the tap to be measured and thus serves to center the tap between the members 30 and 60. A transverse opening 128 permits the members 30 and 60 to engage a tap, as $T^2$, extending through the opening 127.

In order to permit the tap $T^2$ to be inserted through the opening 127, we have provided a spring 130 (Fig. 11) engaging an offset arm 131 on the lever 120 and acting to move the arm to the inoperative position indicated in Fig. 12, such movement carrying the positioning member 124 forward or away from the indicating plunger 30 to a point where a tap may be inserted through the opening 127 without engaging the point of the plunger 30.

A stud 133 extends through the stand 122, the spring 130 and the arm 131, and is provided with a nut 134 by which the amount of swinging movement may be limited.

For convenience in setting up the machine for different lots of taps, we provide a graduation 136 (Fig. 9) on the positioning member 124, in exact alignment with the center of the opening 127. We also provide a graduation 138 on a setting stand 139, mounted in the left hand portion of the guideway 22. In setting up the machine, the plunger 60 and its stand may be adjusted until the tap $T^2$ positioned by the member 124 aligns the graduation 136 thereof with the graduation 138 on the setting stand 139.

Having described the details of construction of our invention as designed for measuring two-fluted taps, the method of operation thereof is as follows:—

The handle 75 is first moved in the direction of the arrow $a$ in Fig. 1 to withdraw the plunger 61, and a standard or master thread gauge is then placed in position between the two contact members 30 and 60.

The casing 24 for the indicating plunger 30 is then adjusted forward or rearward to cause the plunger 30 to be engaged by the master gauge as the latter is positioned by the member 60, and to cause said plunger 30 to be moved inward in the bushing 22 a short distance, compressing the spring 34.

The bearing frame 43 is then adjusted axially to place the plunger 42 under compression and to move the pointer 52 in the indicating device a certain angular amount, any one revolution, from its zero or base position.

The parts are secured in these adjusted positions and the dial ring 54 is then turned on the indicating device 50 to bring the zero of the dial to correspond to the position of the arrow 52.

The rearward movement of the plunger 61 forces the contact member 60 against one of the threaded lands of the taps $T^2$, and forces the second and opposite threaded land of the tap against the indicating contact member 30, moving said member 30 rearward a certain distance, depending upon the exact diameter of the tap $T^2$. Any variation in diameter will be made evident by a glance at the indicating device 50, the pointer indicating the variation over size or under size by its movement in one direction or the other from the fixed zero. The dial as shown is graduated to read the variation in tenths of thousandths, but the variation may be magnified to any desired additional extent.

When the tap is to be changed and the member or anvil 60 is withdrawn by the handle 75 (Fig. 1) as previously described, the spring 130 will swing the member 124 to the position shown in Fig. 12, in which position the tap may be removed or inserted without striking the points of the members 30 or 60.

By the use of the machine above described, we are able to inspect taps with ease and rapidity and to very quickly and accurately determine any variation thereof, either over or under the standard diameter as fixed by the master gauge.

The points of the contact members 30 and 60 are suitably shaped to engage between the screw threads. The points are then generally hardened or may be provided with diamond points.

When a tap is held in a vertical position, as indicated in Fig. 7, it will be clear that the anvil 60 and the indicating plunger 30 will engage the tap in different horizontal planes, determined by the pitch of the thread, the member 30 being positioned above the anvil 60 by an amount equal to one-half of the lead of the tap. As this distance varies for taps of different pitches, we provide a series of shims 26ª of different thicknesses, so that a shim may be selected for a desired pitch which will elevate the indicating plunger 30 by the desired amount above the plane of the anvil 60.

Having described our improved measuring machine and its application to taps having two flutes, the use and utility of the machine will be readily apparent. We do not wish to be limited to the details herein disclosed, otherwise than as set forth in the claims, but what we do claim is:

1. In a machine for measuring two-fluted taps, a contact member, an indicating device operable thereby, a positioning member opposed to said contact member, means to locate said positioning member in a predetermined normal position, means to withdraw said positioning member from normal position, means to return said member to said predetermined normal position, a device for locating a tap between said members, said device being movable toward and from said contact member substantially along the center line of said contact and positioning members, and means to move said locating device away from said contact member when said positioning member is withdrawn from its predetermined normal position.

2. In a machine for measuring threaded work, a contact member, an indicating device operable thereby, a positioning member opposed to said contact member, means to locate said positioning member in a predetermined normal position, means to withdraw said positioning member from normal position, means to return said member to said predetermined normal position, a device for locating a tap between said members, said device being movable toward and from said contact member, and a spring to move said locating device away from said contact member when said positioning member is withdrawn from its predetermined normal position.

3. In a machine for measuring threaded work, a contact member, an indicating device operable thereby, a positioning member opposed to said contact member, means to locate said positioning member in a predetermined normal position, means to withdraw said positioning member from normal position, a spring to return said member to said predetermined normal position, a device for locating a tap between said members, said device being movable toward and from said contact member, and a spring to move said locating device away from said contact member when said positioning member is withdrawn from its predetermined normal position, said first spring being substantially stronger than said second spring and being effective to overcome the pressure of said second spring and also the resistance of the indicating device.

4. In a machine for measuring threaded work, a contact member, an indicating device operable thereby, a positioning member opposed to said contact member, means to locate said positioning member in a predetermined normal position, means to withdraw said positioning member from normal position, means to return said member to said predetermined normal position, a pivotally mounted lever extending between said members and movable toward and from said contact member and having an aperture to receive and guide a tap, and a spring acting to urge said lever away from said contact member.

5. The combination in a measuring machine as set forth in claim 4, in which the end portion of said lever in which said aperture is formed is removable and replaceable, whereby said positioning device may be adapted to taps of different diameters.

In testimony whereof we have hereunto affixed our signatures.

HARVEY M. ALLISON.
ERNEST A. WALKER.